(12) United States Patent
Norton, Jr. et al.

(10) Patent No.: US 10,901,501 B2
(45) Date of Patent: Jan. 26, 2021

(54) AMBIENT LIGHT INTENSITY ADJUSTMENT BASED UPON PUPIL SIZE

(71) Applicant: Lenovo (Singapore) Pte. Ltd., Singapore (SG)

(72) Inventors: Robert James Norton, Jr., Raleigh, NC (US); Robert James Kapinos, Durham, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/454,164

(22) Filed: Jun. 27, 2019

(65) Prior Publication Data
US 2020/0409456 A1 Dec. 31, 2020

(51) Int. Cl.
*G06F 3/01* (2006.01)
*G06F 3/00* (2006.01)
*G06K 9/00* (2006.01)

(52) U.S. Cl.
CPC .............. *G06F 3/013* (2013.01); *G06F 3/005* (2013.01); *G06K 9/00597* (2013.01); *G06T 2207/30041* (2013.01)

(58) Field of Classification Search
CPC .................................. G06F 3/013; G06F 3/005
See application file for complete search history.

(56) References Cited

U.S. PATENT DOCUMENTS

2016/0231573 A1* 8/2016 Mullins ................ G02B 27/017

* cited by examiner

*Primary Examiner* — Girumsew Wendmagegn
(74) *Attorney, Agent, or Firm* — Ference & Associates LLC

(57) ABSTRACT

One embodiment provides a method, including: capturing, using a camera of an information handling device, an image of a user's pupil; measuring, using a processor, a size of the user's pupil in the captured image; determining, using a processor, whether the size of the user's pupil is within a threshold pupillary size range; and providing, responsive to determining that the size of the user's pupil is not within the threshold pupillary size range; an instruction to a light-producing device to adjust an ambient light intensity level until the size of the user's pupil is determined to be within the threshold pupillary size range. Other aspects are described and claimed.

20 Claims, 3 Drawing Sheets

AMBIENT LIGHT INTENSITY ADJUSTMENT BASED UPON PUPIL SIZE

BACKGROUND

Users interact with their information handling devices ("devices"), for example, smart phones, tablet devices, augmented reality ("AR") and/or virtual reality ("VR") devices, laptop and/or personal computers, televisions ("TVs"), and the like, frequently throughout the day. If ambient light levels are not optimal, users may not be able to properly visualize content that is displayed on a screen of their device. Additionally, extended use of these devices may cause eye strain if the ambient light levels are not appropriate for a user's viewing context.

BRIEF SUMMARY

In summary, one aspect provides a method, comprising: capturing, using a camera of an information handling device, an image of a user's pupil; measuring, using a processor, a size of the user's pupil in the captured image; determining, using a processor, whether the size of the user's pupil is within a threshold pupillary size range; and providing, responsive to determining that the size of the user's pupil is not within the threshold pupillary size range; an instruction to a light-producing device to adjust an ambient light intensity level until the size of the user's pupil is determined to be within the threshold pupillary size range.

Another aspect provides an information handling device, comprising: a camera; a processor; a memory device that stores instructions executable by the processor to: capture an image of a user's pupil using the camera; measure a size of the user's pupil; determine whether the size of the user's pupil is within a threshold pupillary size range; and provide, responsive to determining that the size of the user's pupil is not within the threshold pupillary size range, an instruction to a light-producing device to adjust an ambient light intensity level until the size of the user's pupil is determining to be within the pupillary size range.

A further aspect provides a product, comprising: a storage device that stores code, the code being executable by a processor and comprising: code that captures an image of a user's pupil; code that measures a size of the user's pupil in the image; code that determines whether the size of the user's pupil is within a threshold pupillary size range; and code that provides, responsive to determining that the size of the user's pupil is not within the threshold pupillary size range, and instruction to a light-producing device to adjust an ambient light intensity level until the size of the user's pupil is determined to be within the threshold pupillary size range.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
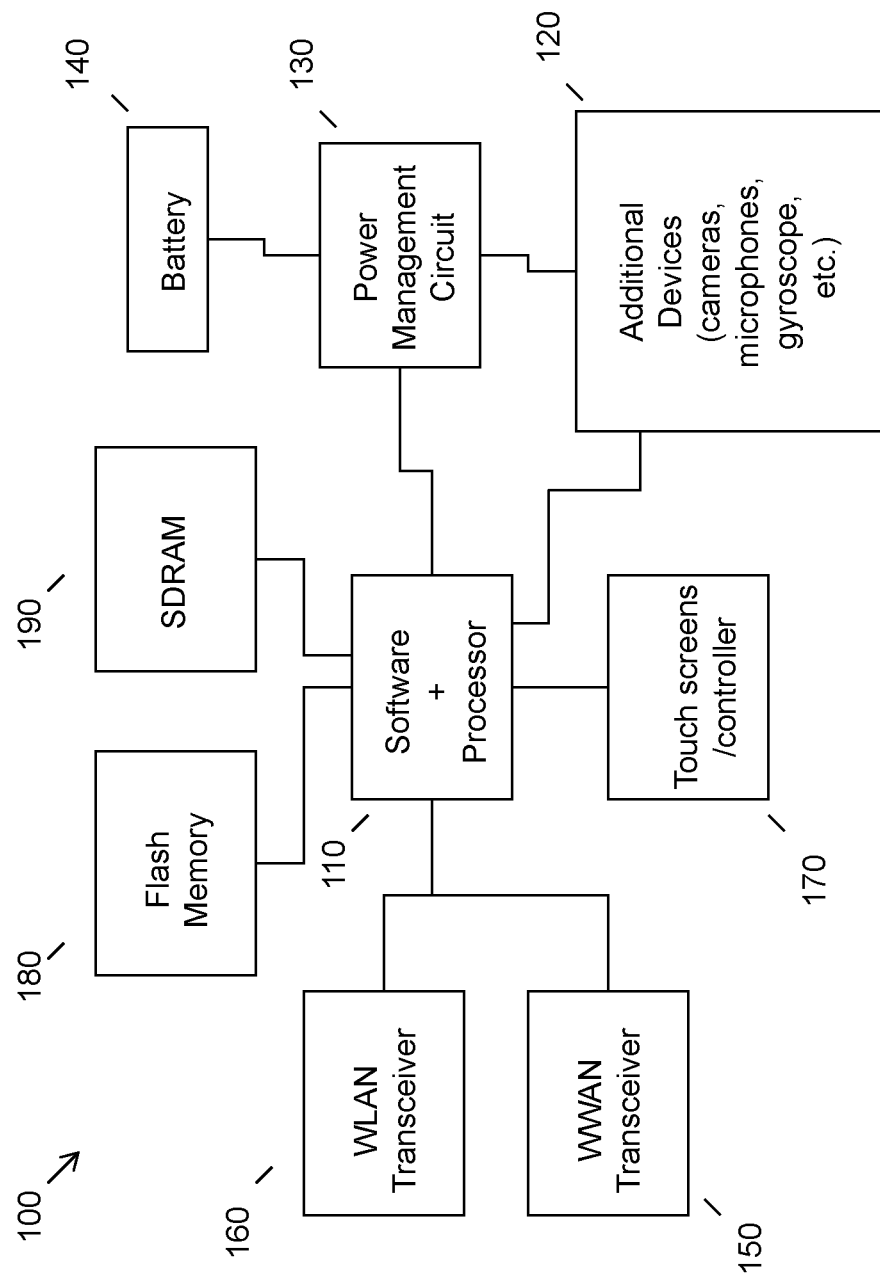
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Optimal lighting conditions may vary depending upon a user's viewing context (e.g., a device a user is utilizing, a location a user is in, types of content a user is interacting with, etc.). For example, a user wearing an AR headset may have trouble visualizing AR content displayed/projected on a screen/lens of the headset if the lighting conditions are too bright. More particularly, the AR images may appear washed out against the real-world background. As another example, if a user is staring at a laptop screen for an extended period of time in a dark room their eyes may become strained, which may be painful and potentially lead to other eye problems if the user frequently interacts with the laptop under these lighting conditions.

Conventional methods for addressing the foregoing issues exist. For instance, users may manually make adjustments to ambient light settings by physically interacting with light switches and/or light settings. However, such a solution places an additional onus on the user and may be time-consuming and burdensome. Other solutions exist that employ eye-tracking and/or pupil dilation technologies for automatically adjusting a backlight of a display based at least upon a measurement of the size of a user's pupil. Although effective for dynamically adjusting the intensity of light output from a user's device, these solutions are unable to address the underlying issue, which is that the light levels in a user's environment are not optimized for their viewing situation.

Accordingly, an embodiment provides a method for dynamically adjusting ambient light intensity levels in a user's environment based at least upon pupil size measurements. In an embodiment, an image of a user's pupil may be captured by a camera of a device. An embodiment may then measure the size of the pupil in the captured image and determine whether the size is within a threshold pupillary size range. The threshold pupillary size range may correspond to an acceptable range of pupil sizes for which a user may comfortably view content on a particular device and/or in a particular viewing context. Responsive to determining that the size of the user's pupil is not within the acceptable range, an embodiment may provide an instruction to one or more connected light-producing devices to adjust an intensity level of the produced light. In an embodiment, the intensity of the produced light may be adjusted by a factor that may change the size of the user's pupil until it is within the acceptable range. Such a method may make automatic light adjustments in a user's environment in order to better adjust the ambient lighting to a user's viewing context.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
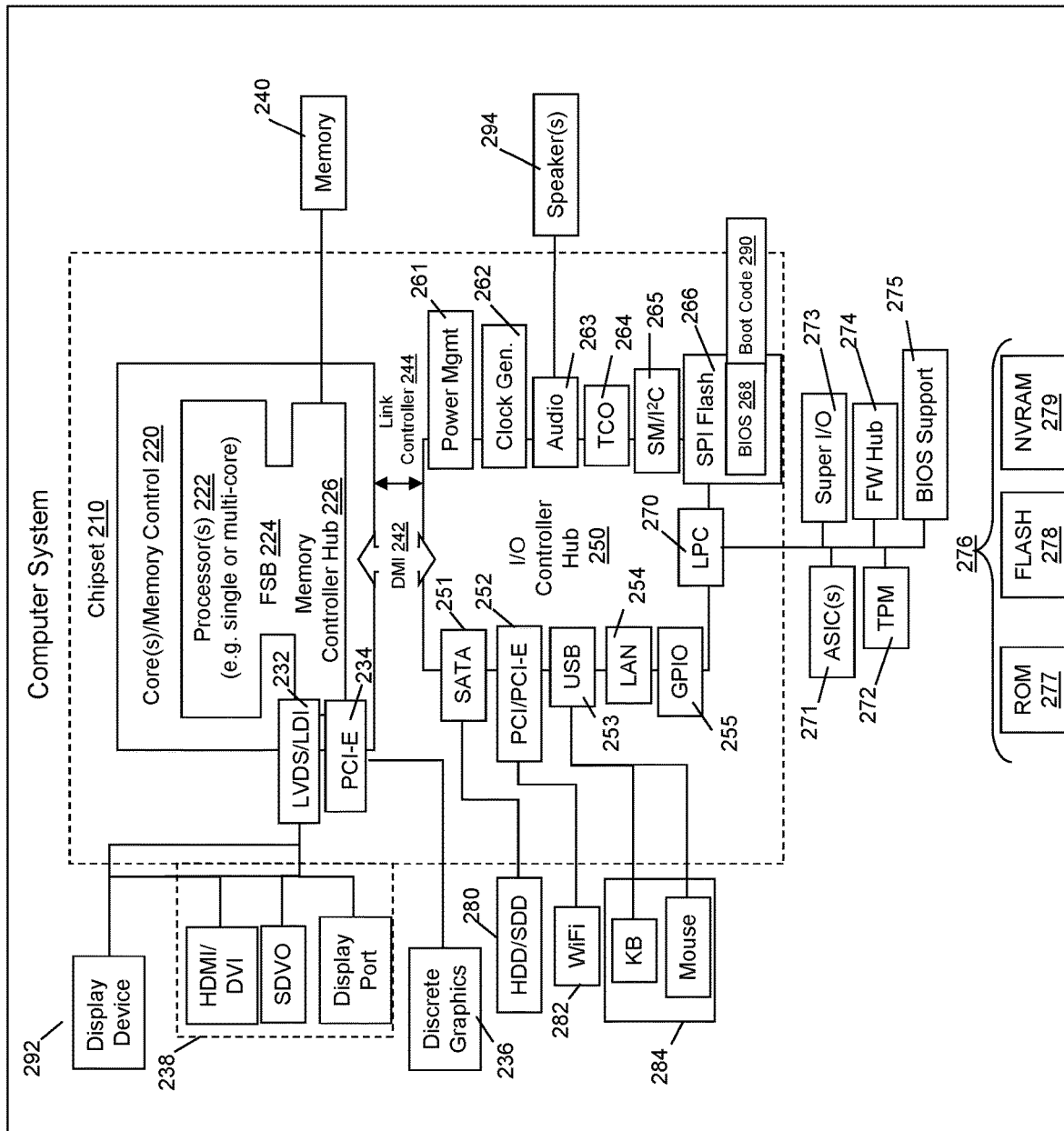
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, and/or electronic devices that may be able to capture an image of a user's pupil and communicate with one or more other connected devices. For example, the circuitry outlined in FIG. 1 may be implemented in a tablet or smart phone embodiment, whereas the circuitry outlined in FIG. 2 may be implemented in a laptop.

Figure 3:
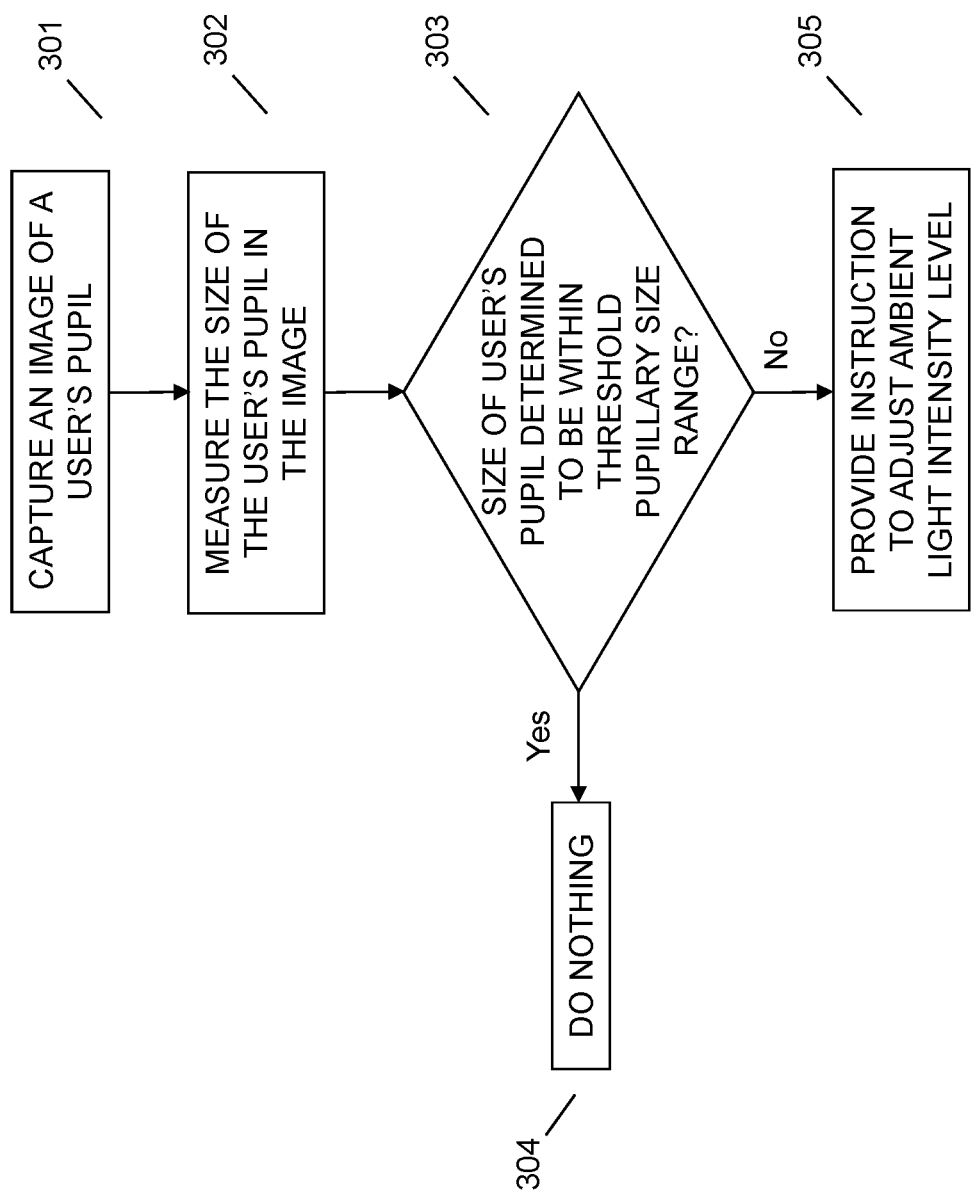
FIG. 3 illustrates an example method of adjusting an ambient light setting based at least in part on a user's pupil size.

Referring now to FIG. 3, an embodiment may dynamically adjust the ambient light levels in a user's environment to best suit a user's viewing context. At 301, an embodiment may capture an image of a user's pupil. In an embodiment, the image may be captured by a camera integrated into the device, or, alternatively, by a camera that is situated apart from the device but is still in wired or wireless communication with the device (e.g., an independent camera, a camera integrated into another device, etc.). In an embodiment, the device may be one of a variety of different types of devices including, but not limited to, a user's smart phone, tablet, laptop or personal computer, AR or VR headset, television set, and the like.

In an embodiment, the capturing of the image may occur at predetermined intervals. For example, an image may be captured at a predetermined time intervals (e.g., every 5 seconds, every 30 seconds, every minute, etc.). Additionally or alternatively, an image may be captured each time a user attempts to interact with the device (e.g., picks up the device, looks at the device, provides a command to the device, etc.). Additionally or alternatively, an image may be captured each time a change in ambient light levels is detected (e.g., by one or more light detecting sensors integrally or operatively coupled to the device, etc.).

At 302, an embodiment may measure the size of the user' pupil in the captured image. In an embodiment, the measurement may be performed automatically using one or more image and/or pupil analysis techniques known in the art. In an embodiment, the measurement may occur substantially immediately after the image is captured or at some later point in time.

At 303, an embodiment may determine whether a size of the user's pupil is within a threshold pupillary size range. In an embodiment, the threshold pupillary size range may be a range identified as being appropriate for a user's particular viewing context (e.g., a device they are viewing content on, a location they are viewing content in, type of content they are viewing, viewing distance from the screen of the device, etc.). Additional physical characteristics of a user that may affect the underlying threshold pupillary size range may also be considered such as a user's gender, age, existing disabilities, and the like.

In an embodiment, the acceptable range for each viewing context may be set by a manufacturer and/or later adjusted by a user. Additionally or alternatively, acceptable ranges may be identified via crowdsourced data or data obtained from other sources (e.g., online articles or websites identifying optimal pupil size ranges for different viewing contexts, etc.). Additionally or alternatively, an embodiment may dynamically identify acceptable ranges for particular viewing contexts based upon tracking and recording the behavior of a user's pupil while visualizing content in different contexts. More particularly, an embodiment may identify the most common sizes of a user's pupil while the user is in a particular viewing context and thereafter define the acceptable pupillary size range for that viewing context by the smallest and largest common pupil size. In an embodiment, the acceptable pupil size ranges for each viewing context may be stored at an accessible storage location (e.g., locally on the device, remotely on another device or server, etc.).

As previously mentioned, the acceptable pupillary size range may change based upon a user's viewing context. For example, a user visualizing AR content on an AR headset may not want to be in an environment that is too bright because the displayed AR content may be difficult to see. Accordingly, an acceptable pupillary size range for viewing content on AR-enabled devices may be biased towards larger pupil sizes (i.e., pupil sizes that are more common in dimmer environments). As another example, a user reading a book on their tablet or other type of e-reader may not want to be in an environment that is too dark because prolonged interaction with a screen in those dim environments may cause eye strain. Accordingly, an acceptable pupillary size range for viewing content on tablets or e-readers may be biased towards small pupil sizes (i.e., pupil sizes that are more common in brighter environments).

In an embodiment, the determination may be conducted by first identifying the user's current viewing context. The identification of this context may allow an embodiment to identify and access the corresponding threshold pupillary size range that applies to the user's current viewing context. In an embodiment, adjustments may be made to the identified threshold pupillary size range based upon any of the relevant aforementioned physical characteristics of a user. Thereafter, an embodiment may compare the measured size of the user's pupil in the image to the relevant threshold pupillary size range.

Responsive to determining, at 303, that the user's pupil is within the threshold pupillary size range, an embodiment may, at 304, take no additional action. More particularly, an embodiment may maintain the ambient light settings the way they are. Conversely, responsive to determining, at 303, that the user's pupil is not within the threshold pupillary size range, an embodiment may, at 305, provide an instruction to one or more light-producing sources to adjust an intensity level of emitted light.

In an embodiment, the light-producing sources may be other devices that a user's device may communicate with (e.g., wirelessly, etc.). More particularly, the light-producing sources may be other devices that are part of the same home automation network that the user's device is connected to. For example, the user's device and the light-producing sources may all be Internet of Things (IoT) devices connected to the same network. In an embodiment, the other devices may be of a variety of different types such as dedicated lighting devices (e.g., smart lights, smart lamps, smart switches, etc.), devices with light-producing sources (e.g., other devices comprising display screens, etc.), other smart devices with light affecting abilities (e.g., smart blinds, etc.). In an embodiment, the identification of which devices to send an instruction to may be dependent on one or more criteria (e.g., power of the light source, light source cost, user preference, a combination thereof, etc.).

In an embodiment, responsive to identifying that a user's pupil size is larger than the largest pupil size in the acceptable range, an embodiment may provide an instruction to increase the intensity level of emitted light. For example, an embodiment may brighten existing lights, turn on more lights, raise the blinds to let in more natural light to the user's area, a combination thereof, and the like. Such an instruction may produce more light in a user's area, which would correspondingly decrease the size of the user's pupil. In the opposite, responsive to identifying that a user's pupil size is smaller than the smallest pupil size in the acceptable range, an embodiment may provide an instruction to decrease the intensity level of emitted light. For example, an embodiment may dim existing lights, turn off one or more existing lights, lower the blinds to decrease the amount of natural light in a user's area, a combination thereof, and the like. Such an instruction may produce less light in a user's area, which would correspondingly increase the size of the user's pupil.

In an embodiment, the ambient light levels may be adjusted by a factor that may be expected to change the size of the user's pupil to another size that is within the threshold pupillary size range for the user's viewing context. In an embodiment, the precise factor may be identified by first identifying the illuminance (i.e., the measure of luminous flux over a given area) of a predetermined space. An embodiment may then refer to an accessible database that comprises a list of associations between illuminance conditions and corresponding expected pupil sizes in those conditions. From this list, an embodiment may identify a desired illuminance for the user's area for which the user's pupil size would fall within the threshold pupillary size range and thereafter adjust the ambient light levels by the factor that would change the illuminance of the user's area from the current levels to the desired levels. Additionally or alternatively, an embodiment may make multiple micro adjustments in the ambient light and may make multiple measurements of the user's pupil size until it is determined that the user's pupil size is within the threshold pupillary size range.

An embodiment may also be able to identify whether an interaction interval between the user and their device is responsible for the user's pupil size not being in the acceptable pupillary size range. In the context of this application, an interaction interval may correspond to a length of time a user has interacted with their device. In an embodiment, a type of device a user is interacting with may be identified, as well as how long a user has been interacting with that device and under what illuminance conditions. An embodiment may also have access to a database comprising a list of recommended interaction intervals for each type of device, and under different light conditions, that a user's pupil size is likely to remain in the acceptable pupillary size range. Responsive to identifying that the interaction interval between the user and the device exceeds the recommended interaction interval for the device under the user's current lighting condition, an embodiment may provide the instruction to adjust an ambient light setting. As an example of the foregoing, an embodiment may identify that a user has been interacting with their laptop computer for a period of two hours in dim lighting. With reference to the aforementioned database, an embodiment may conclude that a user's eyes are likely being strained under these conditions and may provide an instruction to increase the ambient light intensity levels based upon this conclusion.

The various embodiments described herein thus represent a technical improvement to conventional ambient light adjustment techniques. Using the techniques described herein, an embodiment may capture an image of a user's pupil and measure the size of it. An embodiment may then determine whether the size of the user's pupil falls within a threshold pupillary size range for a user's viewing context. Responsive to determining that it does not, an embodiment may then provide an instruction to one or more other devices to adjust a light intensity level of a user's space until the user's pupil size is within the acceptable threshold pupillary range. Such a method may negate the need for users to manually adjust their ambient light settings and may correspondingly create lighting conditions that are optimal for a user's viewing context.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using a camera of an information handling device, an image of a user's pupil;
measuring, using a processor, a size of the user's pupil in the captured image;
identifying a viewing context associated with the user, wherein the viewing context corresponds to a type of the information handling device and content displayed on the information handling device;
determining, using a processor, whether the size of the user's pupil is within a threshold pupillary size range, wherein the threshold pupillary size range is based upon the viewing context; and
providing, responsive to determining that the size of the user's pupil is not within the threshold pupillary size range; an instruction to a light-producing device to adjust an ambient light intensity level until the size of the user's pupil is determined to be within the threshold pupillary size range.

2. The method of claim 1, wherein the information handling device is an augmented-reality capable device.

3. The method of claim 1, wherein the capturing comprises capturing at predetermined intervals.

4. The method of claim 1, wherein the determining comprises determining that the size of the user's pupil is greater than a largest pupil size in the threshold pupillary size range.

5. The method of claim 4, wherein the instruction is an instruction to increase the ambient light intensity level of the light-producing device.

6. The method of claim 1, wherein the determining comprises determining that the size of the user's pupil is smaller than a smallest pupil size in the threshold pupillary size range.

7. The method of claim 6, wherein the instruction is an instruction to decrease the ambient light intensity level of the light-producing device.

8. The method of claim 1, wherein the providing the instruction to adjust comprises providing the instruction to adjust by a predetermined factor.

9. The method of claim 1, further comprising identifying that an interaction interval between the user and the information handling device causes the size of the user's pupil to not be within the threshold pupillary size range.

10. The method of claim 9, wherein the providing comprises providing the instruction based on the identifying.

11. An information handling device, comprising:
a camera;
a processor;
a memory device that stores instructions executable by the processor to:
capture an image of a user's pupil using the camera;
measure a size of the user's pupil;
identify a viewing context associated with the user, wherein the viewing context corresponds to a type of the information handling device and content displayed on the information handling device;
determine whether the size of the user's pupil is within a threshold pupillary size range, wherein the threshold pupillary size range is based upon the viewing context; and
provide, responsive to determining that the size of the user's pupil is not within the threshold pupillary size range, an instruction to a light-producing device to adjust an ambient light intensity level until the size of the user's pupil is determining to be within the pupillary size range.

12. The information handling device of claim 11, wherein the instructions executable by the processor to capture comprise instructions executable by the processor to capture at predetermined intervals.

13. The information handling device of claim 11, wherein the instructions executable by the processor to determine comprise instructions executable by the processor to determine that the size of the user's pupil is greater than a largest pupil size in the threshold pupillary size range.

14. The information handling device of claim 13, wherein the instruction is an instruction to increase the ambient light intensity level of the light-producing device.

15. The information handling device of claim 11, wherein the instructions executable by the processor to determine comprise instructions executable by the processor to determine that the size of the user's pupil is smaller than a smallest pupil size in the threshold pupillary size range.

16. The information handling device of claim 15, wherein the instructions is an instruction to decrease the ambient light intensity level of the light-producing device.

17. The information handling device of claim 11, wherein the instructions executable by the processor to provide the instruction comprise instructions executable by the processor to provide the instruction by a predetermined factor.

18. The information handling device of claim 11, wherein the instructions are further executable by the processor to identify that an interaction interval between the user and the information handling device causes the size of the user's pupil to not be within the threshold pupillary size range.

19. The information handling device of claim 18, wherein the instructions executable by the processor to provide comprise instructions executable by the processor to provide the instruction based on the identifying.

20. A product, comprising:
a storage device that stores code, the code being executable by a processor and comprising:
code that captures an image of a user's pupil;
code that measures a size of the user's pupil in the image;
code that identifies a viewing context associated with the user, wherein the viewing context corresponds to a type of an information handling device containing the processor and content displayed on the information handling device;
code that determines whether the size of the user's pupil is within a threshold pupillary size range, wherein the threshold pupillary size range is based upon the viewing context; and
code that provides, responsive to determining that the size of the user's pupil is not within the threshold pupillary size range, and instruction to a light-producing device to adjust an ambient light intensity level until the size of the user's pupil is determined to be within the threshold pupillary size range.

* * * * *